US012673533B2

(12) United States Patent
Kim et al.

(10) Patent No.: US 12,673,533 B2
(45) Date of Patent: Jul. 7, 2026

(54) HEAT PUMP SYSTEM FOR A VEHICLE

(71) Applicants: HYUNDAI MOTOR COMPANY, Seoul (KR); KIA CORPORATION, Seoul (KR)

(72) Inventors: Yeonho Kim, Seoul (KR); Yong Woong Cha, Yongin-si (KR); Hochan An, Hwaseong-si (KR); Taehan Kim, Seoul (KR); Wan Je Cho, Hwaseong-si (KR); Hyunsub Lee, Hwaseong-si (KR); Jeawan Kim, Hwaseong-si (KR); Hoyoung Jeong, Hwaseong-si (KR); Man Hee Park, Suwon-si (KR); Yeong Jun Kim, Incheon (KR); Jae Yeon Kim, Hwaseong-si (KR); Tae Hee Kim, Ansan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 94 days.

(21) Appl. No.: 18/615,979

(22) Filed: Mar. 25, 2024

(65) Prior Publication Data

US 2025/0115093 A1     Apr. 10, 2025

(30) Foreign Application Priority Data

Oct. 4, 2023     (KR) ........................ 10-2023-0131523

(51) Int. Cl.
B60H 1/00          (2006.01)
B60H 3/02          (2006.01)

(52) U.S. Cl.
CPC ..... B60H 1/00899 (2013.01); B60H 1/00278 (2013.01); B60H 3/024 (2013.01)

(58) Field of Classification Search
CPC . B60H 1/00899; B60H 1/00278; B60H 3/024
See application file for complete search history.

(56) References Cited

U.S. PATENT DOCUMENTS

2022/0088995 A1*   3/2022   Kim ................... B60H 1/00278
2023/0194136 A1*   6/2023   Kim ........................ F25B 45/00
                                                         62/324.4

* cited by examiner

*Primary Examiner* — Elizabeth J Martin
(74) *Attorney, Agent, or Firm* — Lempia Summerfield Katz LLC

(57)          ABSTRACT

A heat pump system for a vehicle is provided to efficiently perform heating of a vehicle interior in a state in which the external temperature is low and heat generated by a heating element is not sufficient in an early stage of driving the vehicle. The heat pump system may include: a compressor; a heat, ventilation, and air condition (HVAC) module; a heat-exchanger; a first expansion valve; an accumulator; a first connection line; a chiller; and a second expansion valve.

19 Claims, 4 Drawing Sheets

HEAT PUMP SYSTEM FOR A VEHICLE

CROSS-REFERENCE TO RELATED APPLICATION

This application claims priority to and the benefit of Korean Patent Application No. 10-2023-0131523 filed on Oct. 4, 2023, the entire contents of which are incorporated herein by reference.

BACKGROUND

(a) Field

The present disclosure relates to a heat pump system for a vehicle. More particularly, the present disclosure relates to a heat pump system for a vehicle capable of efficiently performing heating of a vehicle interior.

(b) Description of the Related Art

Generally, an air conditioning system for a vehicle includes an air conditioner unit circulating a refrigerant in order to heat or cool an interior of the vehicle.

The air conditioner unit is used to maintain the interior of the vehicle at an appropriate temperature regardless of a change in an external temperature. The air conditioning unit is configured to heat or cool the interior of the vehicle by circulating refrigerant discharged from a compressor, while exchanging heat between a condenser and an evaporator. In this process, the refrigerant discharged by driving the compressor passes through the condenser, a receiver drier, an expansion valve, and the evaporator, and the refrigerant is circulated back to the compressor.

In other words, the air conditioner unit lowers a temperature and a humidity of the interior of the vehicle by condensing a high-temperature high-pressure gas-phase refrigerant compressed from the compressor by the condenser, passing the refrigerant through the receiver drier and the expansion valve, and then evaporating the refrigerant in the evaporator in a cooling mode.

In accordance with a continuous increase in interest in energy efficiency and an environmental pollution, the development of an environmentally-friendly vehicle capable of substantially substituting for an internal combustion engine vehicle is desired. The environmentally-friendly vehicle is classified into an electric vehicle driven using a fuel cell or electricity as a power source and a hybrid vehicle driven using an engine and a battery.

An air conditioning apparatus applied to such an environment-friendly vehicle is typically referred to as a heat pump system.

The electric vehicle driven by a power source of a fuel cell generates driving force by converting chemical reaction energy between oxygen and hydrogen into electrical energy. In this process, heat energy is generated by a chemical reaction in the fuel cell. Therefore, it is desired to secure the performance of the fuel cell to effectively remove generated heat.

In addition, a hybrid vehicle generates driving force by driving a motor using electricity supplied from the fuel cell described above or an electrical battery, together with an engine operated by general fuel. Therefore, heat generated from the fuel cell or the battery and the motor should be effectively removed in order to secure performance of the motor.

Therefore, in the hybrid vehicle or the electric vehicle according to the related art, a cooling means, a heat pump system, and a battery cooling system, respectively, should be configured as separate closed circuits so as to prevent heat generation from the motor, an electric component, and the battery including a fuel cell.

Therefore, the size and weight of a cooling module disposed at the front of the vehicle are increased, and a layout of connection pipes supplying a refrigerant and a coolant to each of the heat pump system, the cooling means, and the battery cooling system in an engine compartment becomes complicated.

In addition, since a battery cooling system for heating or cooling the battery according to a state of the vehicle is separately provided to obtain an optimal performance of the battery, a plurality of valves for selectively interconnecting connections pipes is employed. Thus, noise and vibration due to the frequent opening and closing operations of the valves may be introduced into the vehicle interior, thereby deteriorating the ride comfort.

In addition, when heating the vehicle interior, the heating performance may be deteriorated due to the lack of a heat source. Additionally, the electricity consumption may be increased due to the usage of the electric heater, and the power consumption of the compressor may be increased.

The above information disclosed in this Background section is only to enhance understanding of the background of the present disclosure. Therefore, the Background section may contain information that does not form the prior art that is already known in this country to a person of ordinary skill in the art.

SUMMARY

The present disclosure provides a heat pump system for a vehicle capable of efficiently performing heating of a vehicle interior in a state in which the external temperature is low and heat generated by a heating element is not sufficient in an early stage of driving the vehicle.

A heat pump system for a vehicle may include a compressor configured to compress a refrigerant, and a heat, ventilation, and air condition (HVAC) module. The HVAC module may include an internal condenser, an evaporator connected to the compressor via a refrigerant line, and an opening/closing door configured to adjust air having passed through the evaporator to be selectively introduced into the internal condenser depending on a cooling mode or a heating mode of the vehicle. The heat pump system may also include a heat-exchanger connected to the internal condenser via the refrigerant line, a first expansion valve provided in the refrigerant line between the heat-exchanger and the evaporator, and an accumulator provided in the refrigerant line between the evaporator and the compressor. The heat pump system may also include a first connection line having a first end connected to the refrigerant line between the compressor and the internal condenser, and a second end connected to the accumulator. The heat pump system may also include a chiller provided in the first connection line, and configured to adjust a temperature of a coolant by exchanging heat between the refrigerant introduced into the first connection line and a selectively introduced coolant. The heat pump system may also include a second expansion valve provided in the first connection line between the chiller and the accumulator.

A heat pump system for a vehicle may further include a second connection line having a first end connected to the first expansion valve, and a second end connected to the accumulator.

A heat pump system for a vehicle further includes a third expansion valve provided in the refrigerant line between the internal condenser and the heat-exchanger. Additionally, the heat pump system includes a third connection line having a first end connected to the third expansion valve, and a second end connected to the refrigerant line between the heat-exchanger and the first expansion valve.

The first expansion valve, the second expansion valve, and the third expansion valve may be electronic expansion valves configured to selectively expand the refrigerant while controlling a flow of the refrigerant.

In a hot gas heating mode of a vehicle interior, the refrigerant line connecting the first expansion valve and the evaporator and the refrigerant line connecting the evaporator and the accumulator may be closed by an operation of the first expansion valve. The first connection line may be opened by an operation of the second expansion valve. The second connection line may be opened by the operation of the first expansion valve.

The third connection line may be selectively opened and closed by an operation of the third expansion valve.

When the third connection line is opened, the refrigerant line connecting the heat-exchanger and the third expansion valve may be closed. Additionally, the refrigerant line connecting the heat-exchanger and a second end of the third connection line may be closed.

When the third connection line is closed, the refrigerant line connecting the internal condenser and the heat-exchanger may be opened by the operation of the third expansion valve. Additionally, the refrigerant line connecting the heat-exchanger and the first expansion valve may be opened.

The first expansion valve may be configured to expand the refrigerant supplied via the refrigerant line.

The second expansion valve may be configured to expand the refrigerant having passed through the chiller and flow the expanded refrigerant to the first connection line.

The third expansion valve may be configured to flow the refrigerant having passed through the internal condenser without expansion.

A partial refrigerant among the refrigerant discharged from the compressor may flow into the internal condenser along the refrigerant line, and a remaining refrigerant among the refrigerant discharged from the compressor may flow into the chiller along the first connection line.

The chiller may be connected to a battery module via the coolant line through which the coolant circulates.

When heating the battery module in the hot gas heating mode of the vehicle interior, the coolant circulates via the coolant line such that the coolant having exchanged heat with the refrigerant in the chiller may be supplied to the battery module.

In a hot gas heating and dehumidifying mode of a vehicle interior, the refrigerant line connecting the first expansion valve and the evaporator may be opened by an operation of the first expansion valve, The refrigerant line connecting the evaporator and the accumulator may be opened. The first connection line may be opened by an operation of the second expansion valve. Additionally, the second connection line may be closed by the operation of the first expansion valve.

When the third connection line is opened by the third expansion valve, the refrigerant line connecting the heat-exchanger and the third expansion valve may be closed.

Additionally, the refrigerant line connecting the heat-exchanger and a second end of the third connection line may be closed.

When the third connection line is closed by the third expansion valve, the refrigerant line connecting the internal condenser and the heat-exchanger may be opened by an operation of the third expansion valve, and the refrigerant line connecting the heat-exchanger and the first expansion valve may be opened.

The first expansion valve may be configured to expand the refrigerant supplied via the refrigerant line and flow the expanded refrigerant to the evaporator. The second expansion valve may be configured to expand the refrigerant having passed through the chiller and flow the expanded refrigerant to the first connection line.

The third expansion valve may be configured to flow the refrigerant having passed through the internal condenser to the refrigerant line without expansion.

The second expansion valve may be disposed at a rear end of the chiller based on a flow direction of the refrigerant flowing along the first connection line such that the refrigerant having passed through the chiller may be introduced.

As described above, a heat pump system for a vehicle according to an embodiment may efficiently perform heating of a vehicle interior in a state in which the external temperature is low and heat generated by a heating element is not sufficient in an early stage of driving the vehicle.

In addition, according to the present disclosure, since heating of the vehicle interior may be performed by using a high-temperature refrigerant compressed in a compressor while minimizing the required number of components, an electric heater may not be employed. As a result, the configuration streamlines and simplifies the entire system.

In addition, according to the present disclosure, when the electric heater is employed, since the usage of the electric heater may be minimized, electricity consumption may be reduced, and an overall travel distance of the vehicle may be increased.

In addition, according to an embodiment, it is possible to reduce manufacturing cost and weight through simplification of an entire system, and improve space utilization.

BRIEF DESCRIPTION OF THE DRAWINGS

These drawings are for reference only in describing embodiments of the present disclosure. Therefore, the technical idea of the present disclosure should not be limited to the accompanying drawings.

DETAILED DESCRIPTION

Figure 1:
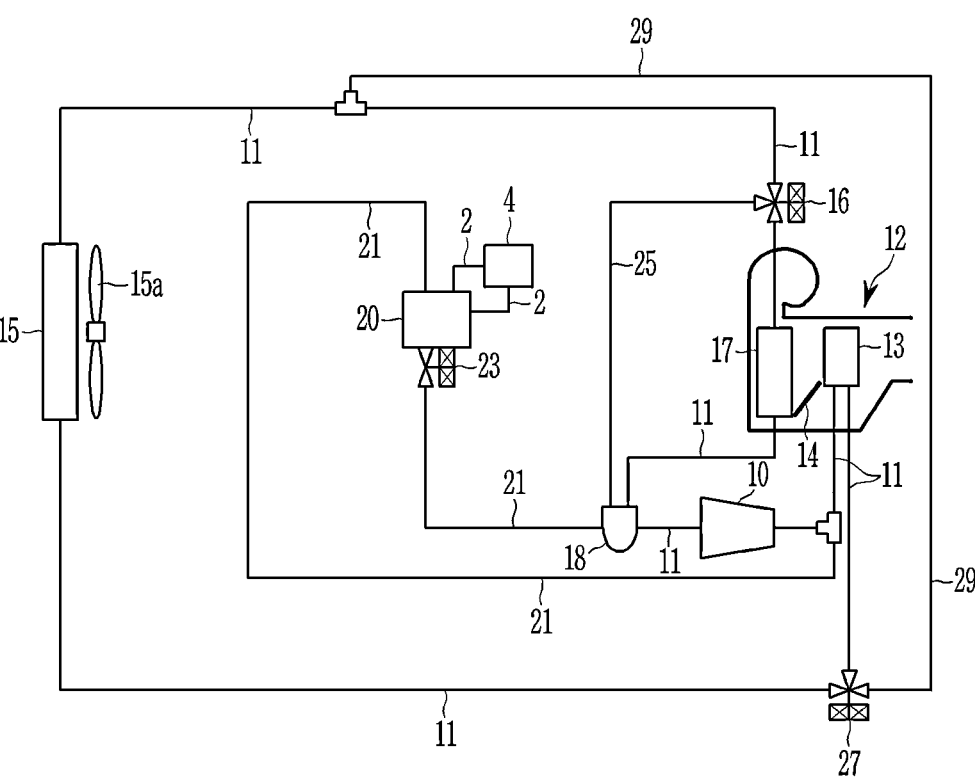
FIG. 1 is a block diagram illustrating a heat pump system for a vehicle according to an embodiment.

The embodiments of the present disclosure are hereinafter described in detail with reference to the accompanying drawings.

The embodiments disclosed in the present disclosure and the constructions depicted in the drawings are only some of the embodiments of the present disclosure, and do not cover the entire scope of the present disclosure. Therefore, it should be understood that there may be various equivalents and variations at the time of the application of this disclosure.

In order to clarify the present disclosure, parts that are not related to the description have been omitted, and the same elements or equivalents are referred to with the same reference numerals throughout the present disclosure.

Also, the size and thickness of each element are arbitrarily shown in the drawings, but the present disclosure is not necessarily limited thereto. Additionally, in the drawings, the thickness of layers, films, panels, regions, and the like, are exaggerated for clarity.

In addition, unless explicitly described to the contrary, the words "comprise" and variations such as "comprises" or "comprising," should be understood to imply the inclusion of stated elements but not the exclusion of any other elements.

Furthermore, each of the terms, such as " . . . unit," " . . . means," " . . . portions," " . . . part," and " . . . member" described in the present disclosure, mean a unit of a comprehensive element that performs at least one function or operation.

When a component, device, element, or the like of the present disclosure is described as having a purpose or performing an operation, function, or the like, the component, device, or element should be considered herein as being "configured to" meet that purpose or perform that operation or function.

FIG. 1 is a block diagram of a heat pump system for a vehicle according to an embodiment.

A heat pump system for a vehicle according to an embodiment may efficiently perform heating of the vehicle interior in a state in which the external temperature is low and heat generated by a heating element is not sufficient in an early stage of driving the vehicle.

In other words, referring to FIG. 1, the heat pump system may include: a compressor 10; a heating, ventilation, and air conditioning (HVAC) module 12; a heat-exchanger 15; a first expansion valve 16; an evaporator 17; an accumulator 18; the chiller 20; a first connection line 21; and a second expansion valve 23.

First, the compressor 10 may compress the introduced refrigerant and flow the compressed refrigerant to the refrigerant line 11 such that the refrigerant may circulate along a refrigerant line 11.

In the present embodiment, an internal condenser 13 and the evaporator 17 connected through the refrigerant line 11 may be provided inside the HVAC module 12.

Additionally, an opening/closing door 14 configured to adjust ambient air having passed through the evaporator 17 to be selectively introduced into the internal condenser 13 may be provided inside the HVAC module 12. The opening/closing door 14 may be positioned between the evaporator 17 and the internal condenser 13.

At the time of heating the vehicle interior, the opening/closing door 14 may be opened such that the ambient air having passed through the evaporator 17 may be introduced into the internal condenser 13.

In other words, the high-temperature refrigerant supplied to the internal condenser 13 may heat the ambient air passing through the internal condenser 13. Since the introduced ambient air is converted to a high-temperature state while passing through the internal condenser 13 and then introduced into the vehicle interior, the heating of the vehicle interior may be realized.

To the contrary, at the time of cooling the vehicle interior, the opening/closing door 14 may close a side toward the internal condenser 13 such that the ambient air cooled while passing through the evaporator 17 may be directly introduced into the vehicle interior.

Accordingly, the ambient air passing through the evaporator 17 may be cooled by the low-temperature refrigerant supplied to the evaporator 17, while passing through the evaporator 17. Since the cooled ambient air is introduced into the vehicle interior, the vehicle interior may be cooled.

In the present embodiment, the heat-exchanger 15 may be connected to the internal condenser 13 through the refrigerant line 11. The heat-exchanger 15 may be disposed in a front portion of the vehicle.

A cooling fan 15a may be provided at a rear of the heat-exchanger 15. Accordingly, the heat-exchanger 15 may exchange heat between the introduced refrigerant and the ambient air introduced by an operation of the cooling fan 15a or by operation of the vehicle (i.e., running or driving the vehicle).

In other words, the heat-exchanger 15 may be an air-cooled heat-exchanger configured to exchange heat between the introduced refrigerant and the ambient air.

The first expansion valve 16 may be provided in the refrigerant line 11 connecting the heat-exchanger 15 and the evaporator 17. The first expansion valve 16 may selectively expand the introduced refrigerant.

The first expansion valve 16 configured as such may selectively expand the refrigerant while controlling the flow of the supplied refrigerant. Additionally, the first expansion valve 16 may be a 3-way electronic expansion valve having one inlet and two outlets.

The accumulator 18 may be provided in the refrigerant line 11 between the evaporator 17 and the compressor 10. The accumulator 18 may supply the gaseous refrigerant to the compressor 10, thereby improving efficiency and durability of the compressor 10.

In the present embodiment, the chiller 20 may be provided in the first connection line 21. The chiller 20 may be connected to a battery module 4 through the coolant line 2 through which a coolant circulates. Accordingly, the coolant may selectively circulate through an interior of the chiller 20.

In other words, the chiller 20 may adjust the temperature of the coolant by exchanging heat between the refrigerant introduced into the first connection line 21 and the selectively introduced coolant.

In more detail, the chiller 20 may adjust the temperature of the coolant by exchanging heat between the supplied refrigerant and the coolant. The chiller 20 may be a water-cooled heat-exchanger that exchanges heat between the interiorly introduced refrigerant and the coolant.

A first end of the first connection line 21 may be connected to the refrigerant line 11 between the compressor 10 and the internal condenser 13. A second end of the first connection line 21 may be connected to an accumulator 18.

In other words, the chiller 20 may adjust the temperature of the coolant by exchanging heat between the coolant selectively introduced through the coolant line 2 and the selectively supplied refrigerant. The coolant having exchanged heat in the chiller 20 may circulate the battery module 4 through the coolant line 2.

A water pump (not shown) may be provided in the coolant line 2. In other words, the coolant may circulate the coolant line 2 according to an operation of the water pump (not shown).

Accordingly, the coolant having exchanged heat with the refrigerant in the chiller 20 may be selectively supplied to the battery module 4, to adjust a temperature of the battery module 4.

In the present embodiment, the second expansion valve 23 may be provided in the first connection line 21 between the chiller 20 and the accumulator 18.

The second expansion valve 23 configured as such may be an electronic expansion valve that selectively expands the refrigerant while controlling the flow of the supplied refrigerant.

The second expansion valve 23 may be disposed downstream (i.e., at a rear end) of the chiller 20 based on a flow direction of the refrigerant flowing along the first connection line 21 such that the refrigerant having passed through the chiller 20 may be introduced.

In other words, the downstream of the chiller 20 may be set based on the flow direction of the refrigerant. Based on a direction in which the refrigerant flows along the first connection line 21, a location from which the refrigerant flows into the chiller 20 may be defined as the upstream of the chiller 20, and a location to which the refrigerant is discharged from the chiller 20 may be defined as the downstream of the chiller 20.

In the present embodiment, a first end of a second connection line 25 may be connected to the first expansion valve 16. A second end of the second connection line 25 may be connected to the accumulator 18.

The heat pump system may further include a third expansion valve 27 and a third connection line 29.

First, the third expansion valve 27 may be provided in the refrigerant line 11 between the internal condenser 13 and the heat-exchanger 15.

The third expansion valve 27 may selectively expand the refrigerant while controlling the flow of the supplied refrigerant. Additionally, the third expansion valve 27 may be a 3-way electronic expansion valve having one inlet and two outlets.

The heat-exchanger 15 may condensate or evaporate the interiorly introduced refrigerant by exchanging heat with the ambient air according to a selective operation of the third expansion valve 27.

In other words, when the third expansion valve 27 expands the refrigerant and supplies the expanded refrigerant, the heat-exchanger 15 may evaporate the supplied refrigerant.

To the contrary, when the third expansion valve 27 supplies the refrigerant without expansion, the heat-exchanger 15 may condense the supplied refrigerant.

In addition, a first end of the third connection line 29 may be connected to the third expansion valve 27. A second end of the third connection line 29 may be connected to the refrigerant line 11 between the heat-exchanger 15 and the first expansion valve 16.

The third connection line 29 configured as such may be selectively opened and closed depending on the operation of the third expansion valve 27.

An operation and action of a heat pump system according to an embodiment configured as such is described in detail with reference to FIGS. 2-4.

First, the operation in a hot gas heating mode of the vehicle interior is described with reference to FIG. 2.

Figure 2:
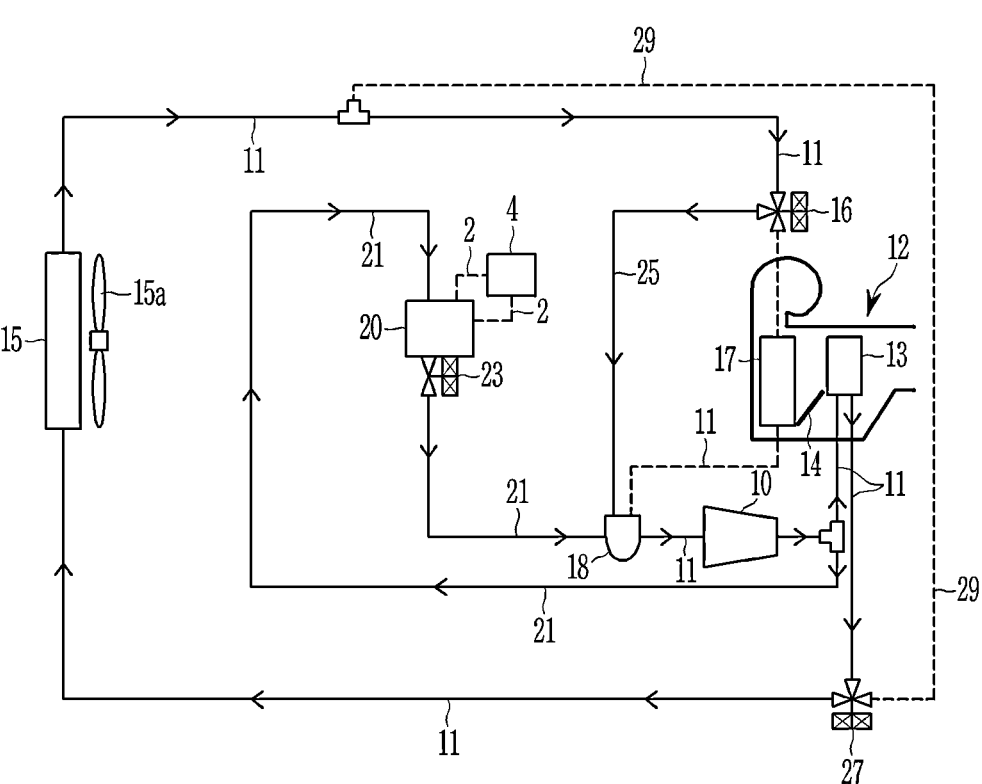
FIG. 2 is an operation diagram illustrating a heat pump system for a vehicle according to an embodiment, in a hot gas heating mode of the vehicle interior.

FIG. 2 is an operation diagram illustrating a heat pump system for a vehicle according to an embodiment, in the hot gas heating mode of the vehicle interior.

Referring to FIG. 2, when the ambient air heat, a waste heat of the electrical component, and a waste heat of the battery module 4 are not sufficient, the heat pump system may not recollect the heat.

In other words, when heating of the vehicle interior is required because the outside temperature is low and the amount of heat generated by the electrical component and the battery module 4 is not sufficient at the early stage of the vehicle's driving, the heat pump system may directly use the refrigerant at high pressure and temperature to perform heating of the vehicle interior.

As such, heating the vehicle interior by using the refrigerant may be referred to as the hot gas heating mode.

In the present embodiment, in the case of the hot gas heating mode of the vehicle interior, the refrigerant line 11 connecting the first expansion valve 16 and the evaporator 17 may be closed by an operation of the first expansion valve 16.

Simultaneously, the refrigerant line 11 connecting the evaporator 17 and the accumulator 18 may be closed.

The first connection line 21 may be opened by an operation of the second expansion valve 23. The second expansion valve 23 may expand the refrigerant having passed through the chiller 20 and flow the expanded refrigerant to the first connection line 21.

In addition, the second connection line 25 may be opened by the operation of the first expansion valve 16. The first expansion valve 16 may expand the refrigerant supplied through the refrigerant line 11.

In the present embodiment, the third connection line 29 may be selectively opened and closed by the operation of the third expansion valve 27.

First, as shown in FIG. 2, when the third connection line 29 is closed, the refrigerant line 11 connecting the internal condenser 13 and the heat-exchanger 15 may be opened by the operation of the third expansion valve 27.

The third expansion valve 27 may flow the refrigerant having passed through the internal condenser 13 without expansion.

Simultaneously, the refrigerant line 11 connecting the heat-exchanger 15 and the first expansion valve 16 may be opened.

In such a state, a partial refrigerant among the refrigerant discharged from the compressor 10 may flow into the internal condenser 13 along the refrigerant line 11.

The opening/closing door 14 may be opened such that the ambient air introduced into the HVAC module 12 may pass through the internal condenser 13.

Accordingly, when passing through the evaporator 17 that is not supplied with the refrigerant, the ambient air introduced from the outside may be introduced into the evaporator 17 at a room temperature state without being cooled. Since the introduced ambient air is converted to a high-temperature state while passing through the internal condenser 13 and then introduced into the vehicle interior, the heating of the vehicle interior may be realized.

The refrigerant having passed through the internal condenser 13 may pass through the heat-exchanger 15 along the refrigerant line 11. At this time, the cooling fan 15a may stop operating.

The refrigerant having passed through the heat-exchanger 15 may flow into the first expansion valve 16 along the refrigerant line 11. The first expansion valve 16 may expand the introduced refrigerant.

The refrigerant expanded in the first expansion valve 16 may flow into the accumulator 18 along the second connection line 25.

A remaining refrigerant among the refrigerant discharged from the compressor 10 may flow into the chiller 20 along the opened first connection line 21.

The coolant line 2 may be closed such that the refrigerant and the coolant may not exchange heat in the chiller 20. In other words, since the heat generated from the battery module 4 is not sufficient, the coolant may not flow into the chiller 20.

The refrigerant having passed through the chiller 20 may be expanded while passing through the second expansion valve 23. The expanded refrigerant may flow into the accumulator 18 along the first connection line 21.

In other words, the refrigerant expanded in the first expansion valve 16 and the refrigerant expanded in the second expansion valve 23 may flow into the accumulator 18, respectively. The refrigerant introduced into the accumulator 18 may be separated into gas and liquid, and the gaseous refrigerant among the refrigerant separated into gas and liquid may flow into the compressor 10.

The refrigerant introduced into the compressor 10 may be supplied back to the internal condenser 13 and the chiller 20, respectively.

In other words, in the present embodiment, while the outside temperature is low, and the heat source is not sufficient at the early stage of the vehicle's driving, by repeating the above-described operation, the vehicle interior may be heated by using the high temperature refrigerant supplied from the compressor 10.

When the third connection line 29 is opened in the hot gas heating mode of the vehicle interior (refer to FIG. 4), the refrigerant line 11 connecting the heat-exchanger 15 and the third expansion valve 27 may be closed.

Simultaneously, the refrigerant line 11 connecting the heat-exchanger 15 and the second end of the third connection line 29 may be closed.

In other words, when the third connection line 29 is opened, the refrigerant having passed through the internal condenser 13 may flow along the third connection line 29 without passing through the heat-exchanger 15.

Then, the refrigerant may be expanded while passing through the first expansion valve 16 along the refrigerant line 11 connected to the third connection line 29. The refrigerant expanded in the first expansion valve 16 may flow into the accumulator 18 along the second connection line 25, and the above-described processes may be repeatedly performed.

As such, when the third connection line 29 is opened, the refrigerant having passed through the internal condenser 13 may rapidly flow without passing through the heat-exchanger 15. Accordingly, the hot gas heating of the vehicle interior may be more efficiently performed.

In the present embodiment, the operation in a hot gas heating and dehumidifying mode of the vehicle interior is described with reference to FIG. 3.

Figure 3:
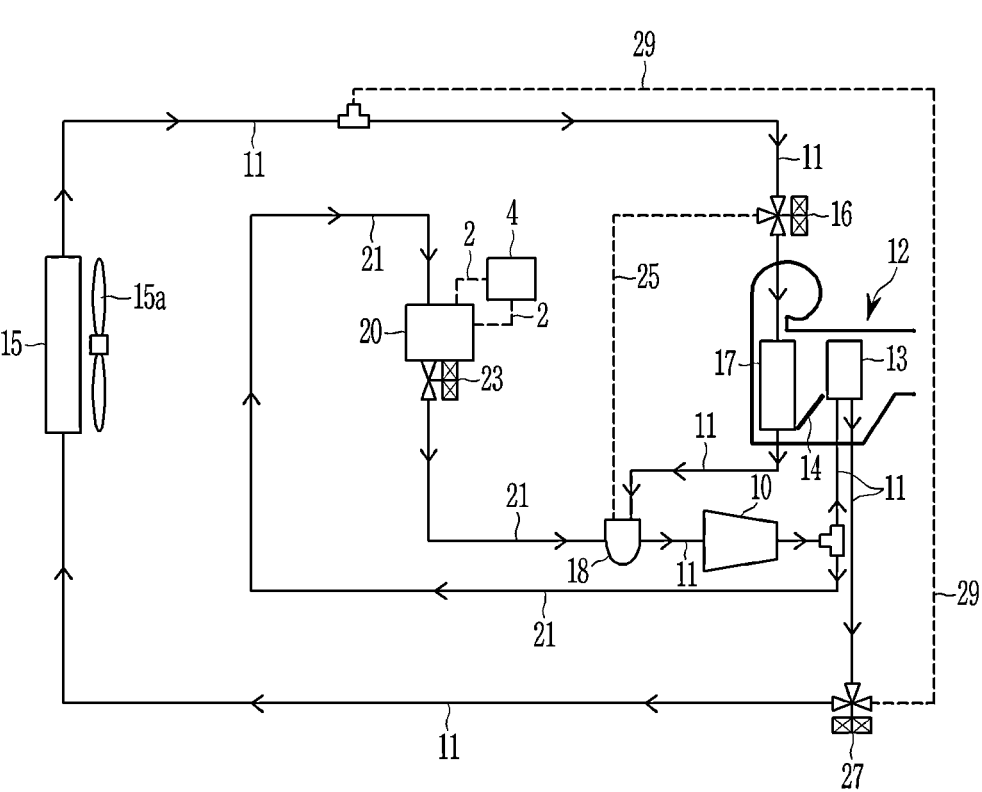
FIG. 3 is an operation diagram illustrating a heat pump system for a vehicle according to an embodiment, in a hot gas heating and dehumidifying mode of the vehicle interior.

FIG. 3 is an operation diagram of a heat pump system for a vehicle according to an embodiment, in the hot gas heating and dehumidifying mode of the vehicle interior.

Referring to FIG. 3, when the ambient air heat, the waste heat of electrical components, and the waste heat of the battery module 4 are not sufficient, the heat pump system may not recollect the heat.

In other words, when heating of the vehicle interior is required in a state that the external temperature is low and the heat generated from the electrical component and the battery module 4 is not sufficient in the early stage of driving the vehicle, the heat pump system may simultaneously perform the heating and dehumidifying of the vehicle interior by directly using the high-pressure and high-temperature refrigerant.

In the present embodiment, in the case of the hot gas heating and dehumidifying mode of the vehicle interior, the refrigerant line 11 connecting the first expansion valve 16 and the evaporator 17 may be opened by the operation of the first expansion valve 16.

Simultaneously, the refrigerant line 11 connecting the evaporator 17 and the accumulator 18 may be opened.

The first connection line 21 may be opened by the operation of the second expansion valve 23. The second expansion valve 23 may expand the refrigerant having passed through the chiller 20 and flow the expanded refrigerant to the first connection line 21.

In addition, the second connection line 25 may be closed by the operation of the first expansion valve 16. The first expansion valve 16 may expand the refrigerant supplied through the refrigerant line 11.

The refrigerant expanded in the first expansion valve 16 may flow into the evaporator 17 along the opened refrigerant line 11.

In the present embodiment, the third connection line 29 may be selectively opened and closed by the operation of the third expansion valve 27.

First, as shown in FIG. 3, when the third connection line 29 is closed by the third expansion valve 27, the refrigerant line 11 connecting the internal condenser 13 and the heat-exchanger 15 may be opened by the operation of the third expansion valve 27.

The third expansion valve 27 may flow the refrigerant having passed through the internal condenser 13 without expansion.

Simultaneously, the refrigerant line 11 connecting the heat-exchanger 15 and the first expansion valve 16 may be opened.

Then, a partial refrigerant among the refrigerant discharged from the compressor 10 may flow into the internal condenser 13 along the refrigerant line 11.

The refrigerant having passed through the internal condenser 13 may pass through the heat-exchanger 15 along the refrigerant line 11. The cooling fan 15a may stop operating.

The refrigerant having passed through the heat-exchanger 15 may flow into the first expansion valve 16 along the refrigerant line 11. The first expansion valve 16 may expand the introduced refrigerant.

The refrigerant expanded in the first expansion valve 16 may pass through the evaporator 17 along the refrigerant line 11 and then flow into the accumulator 18.

A remaining refrigerant among the refrigerant discharged from the compressor 10 may flow into the chiller 20 along the opened first connection line 21.

The coolant line 2 may be closed such that the refrigerant and the coolant may not exchange heat in the chiller 20. In other words, since the heat generated from the battery module 4 is not sufficient, the coolant may not flow into the chiller 20.

The refrigerant having passed through the chiller 20 may be expanded while passing through the second expansion valve 23. The expanded refrigerant may flow into the accumulator 18 along the first connection line 21.

In other words, the refrigerant evaporated from the evaporator 17 and the refrigerant expanded in the second expansion valve 23 may flow into the accumulator 18, respectively. The refrigerant introduced into the accumulator 18 may be separated into gas and liquid, and the gaseous refrigerant among the refrigerant separated into gas and liquid may flow into the compressor 10.

The refrigerant introduced into the compressor 10 may be supplied back to the internal condenser 13 and the chiller 20, respectively.

The opening/closing door 14 may open a portion passing through the internal condenser 13 such that the ambient air introduced into the HVAC module 12 may pass through the evaporator 17 and then flow into the internal condenser 13.

Accordingly, since the ambient air dehumidified while passing through the evaporator 17 is converted to a high-temperature state while passing through the internal condenser 13 and then introduced into the vehicle interior, the vehicle interior may be heated and dehumidified.

In other words, the ambient air introduced into the HVAC module 12 may be dehumidified by the low-temperature refrigerant introduced into the evaporator 17 while passing through the evaporator 17. Thereafter, since the air is converted to a high-temperature state while passing through the internal condenser 13 and then introduced into the vehicle interior, the vehicle interior may be smoothly heated and dehumidified.

Although not shown in the drawings, in the hot gas heating and dehumidifying mode of the vehicle interior, when the third connection line 29 is opened, the refrigerant line 11 connecting the heat-exchanger 15 and the third expansion valve 27 may be closed.

The third expansion valve 27 may flow the refrigerant having passed through the internal condenser 13 without expansion.

Simultaneously, the refrigerant line 11 connecting the heat-exchanger 15 and the second end of the third connection line 29 may be closed.

In other words, when the third connection line 29 is opened, the refrigerant having passed through the internal condenser 13 may flow along the third connection line 29 without passing through the heat-exchanger 15. Thereafter, the refrigerant may be expanded while passing through the first expansion valve 16 along the refrigerant line 11 connected to the third connection line 29.

The refrigerant expanded in the first expansion valve 16 may repeatedly perform the above-described processes, while sequentially passing through the evaporator 17 and the accumulator 18 along the refrigerant line 11.

As such, when the third connection line 29 is opened, the refrigerant having passed through the internal condenser 13 may rapidly flow without passing through the heat-exchanger 15. Accordingly, the hot gas heating and dehumidification of the vehicle interior may be more efficiently performed.

In addition, the operation for heating the battery module 4 in the hot gas heating mode of the vehicle interior is described with reference to FIG. 4.

Figure 4:
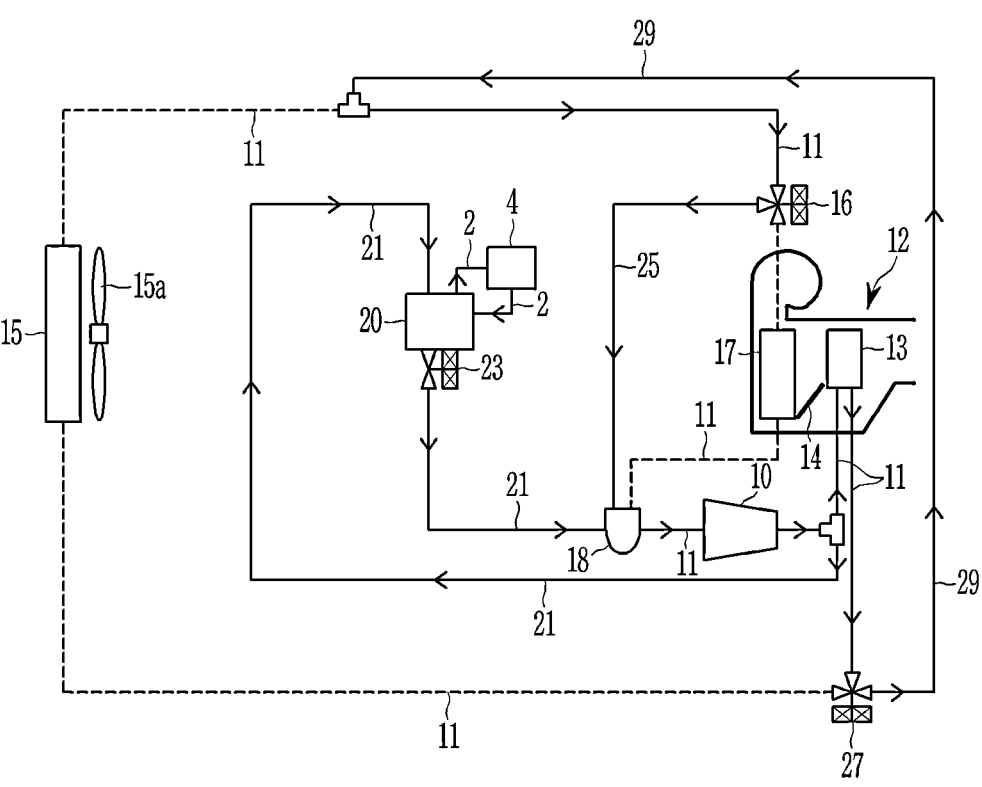
FIG. 4 is an operation diagram illustrating a heat pump system for a vehicle according to an embodiment, for heating a battery module in a hot gas heating mode of the vehicle interior.

FIG. 4 is an operation diagram illustrating a heat pump system for a vehicle according to an embodiment, for heating a battery module in the hot gas heating mode of the vehicle interior.

Referring to FIG. 4, when the ambient air heat, the waste heat of electrical components, and the waste heat of the battery module 4 are not sufficient, the heat pump system may not recollect the heat.

In other words, when heating of the vehicle interior is required in a state that the external temperature is low and the heat generated from the electrical components and the battery module 4 is not sufficient in the early stage of driving the vehicle, the heat pump system may perform heating of the vehicle interior as well as increasing the temperature of the battery module 4. This is achieved by directly using the high-pressure and high-temperature refrigerant.

As such, when the battery module 4 is to be heated in the hot gas heating mode of the vehicle interior, the refrigerant line 11 connecting the first expansion valve 16 and the evaporator 17 may be closed by the operation of the first expansion valve 16.

Simultaneously, the refrigerant line 11 connecting the evaporator 17 and the accumulator 18 may be closed.

The first connection line 21 may be opened by the operation of the second expansion valve 23. The second expansion valve 23 may expand the refrigerant having passed through the chiller 20 and flow the expanded refrigerant to the first connection line 21.

In addition, the second connection line 25 may be opened by the operation of the first expansion valve 16. The first expansion valve 16 may expand the refrigerant supplied through the refrigerant line 11.

In the present embodiment, the third connection line 29 may be selectively opened and closed by the operation of the third expansion valve 27.

First, as shown in FIG. 4, when the third connection line 29 is opened, the refrigerant line 11 connecting the heat-exchanger 15 and the third expansion valve 27 may be closed.

The third expansion valve 27 may flow the refrigerant having passed through the internal condenser 13 without expansion. The refrigerant line 11 connecting the heat-exchanger 15 and the second end of the third connection line 29 may be closed.

In such a state, a partial refrigerant among the refrigerant discharged from the compressor 10 may flow into the internal condenser 13 along the refrigerant line 11.

The opening/closing door 14 may be opened such that the ambient air introduced into the HVAC module 12 may pass through the internal condenser 13.

Accordingly, when passing through the evaporator 17 that is not supplied with the refrigerant, the ambient air introduced from the outside may be introduced into the evaporator 17 at a room temperature state without being cooled. Since the introduced ambient air is converted to a high-temperature state while passing through the internal condenser 13 and then introduced into the vehicle interior, the heating of the vehicle interior may be realized.

The refrigerant having passed through the internal condenser 13 may flow along the opened third connection line 29.

In other words, when the third connection line 29 is opened, the refrigerant having passed through the internal condenser 13 may flow along the third connection line 29 without passing through the heat-exchanger 15.

Then, the refrigerant may be expanded while passing through the first expansion valve 16 along the refrigerant line 11 connected to the third connection line 29. The refrigerant expanded in the first expansion valve 16 may flow into the accumulator 18 along the second connection line 25.

A remaining refrigerant among the refrigerant discharged from the compressor 10 may flow into the chiller 20 along the opened first connection line 21.

The coolant may circulate in the coolant line 2 such that the coolant having exchanged heat with the refrigerant in the chiller 20 may be supplied to the battery module 4.

In other words, the refrigerant introduced into the chiller 20 may exchange heat with the coolant supplied from the battery module 4 through the coolant line 2, thereby increasing the temperature of the coolant.

The coolant heated in the chiller 20 may be supplied to the battery module 4 along the coolant line 2. Accordingly, the temperature of the battery module 4 may be efficiently increased by the coolant heated at the chiller 20.

As such, when the third connection line 29 is opened, the refrigerant having passed through the internal condenser 13 may rapidly flow without passing through the heat-exchanger 15. Accordingly, the hot gas heating of the vehicle interior may be more efficiently performed.

Simultaneously, the coolant heated at the chiller 20 may be supplied to the battery module 4 through the coolant line 2. Accordingly, the temperature of the battery module 4 may be rapidly increased.

In addition, the refrigerant having passed through the chiller 20 may be expanded while passing through the second expansion valve 23. The expanded refrigerant may flow into the accumulator 18 along the first connection line 21.

In other words, the refrigerant expanded in the first expansion valve 16 and the refrigerant expanded in the second expansion valve 23 may flow into the accumulator 18, respectively. The refrigerant introduced into the accumulator 18 may be separated into gas and liquid, and the gaseous refrigerant among the refrigerant separated into gas and liquid may flow into the compressor 10.

The refrigerant introduced into the compressor 10 may be supplied back to the internal condenser 13 and the chiller 20, respectively.

In other words, in the present embodiment, when heat is not sufficient in the early stage of driving the vehicle in a state that the external temperature is low, while repeatedly performing the above-described operation, the vehicle interior may be heated by using the high-temperature refrigerant supplied from the compressor 10, and the temperature of the battery module 4 may be increased by using the coolant having exchanged heat in the chiller 20.

Although not shown in the drawings, when the third connection line 29 is closed, the refrigerant line 11 connecting the internal condenser 13 and the heat-exchanger 15 may be opened by the operation of the third expansion valve 27.

The third expansion valve 27 may flow the refrigerant having passed through the internal condenser 13 without expansion. The refrigerant line 11 connecting the heat-exchanger 15 and the first expansion valve 16 may be opened.

In such a state, a partial refrigerant among the refrigerant discharged from the compressor 10 may flow into the internal condenser 13 along the refrigerant line 11.

The opening/closing door 14 may be opened such that the ambient air introduced into the HVAC module 12 may pass through the internal condenser 13.

Accordingly, when passing through the evaporator 17 that is not supplied with the refrigerant, the ambient air introduced from the outside may be introduced into the evaporator 17 at a room temperature state without being cooled. Since the introduced ambient air is converted to a high-temperature state while passing through the internal condenser 13 and then introduced into the vehicle interior, the heating of the vehicle interior may be realized.

The refrigerant having passed through the internal condenser 13 may pass through the heat-exchanger 15 along the refrigerant line 11. The cooling fan 15a may stop operating.

The refrigerant having passed through the heat-exchanger 15 may flow into the first expansion valve 16 along the refrigerant line 11. The first expansion valve 16 may expand the introduced refrigerant.

The refrigerant expanded in the first expansion valve 16 may flow into the accumulator 18 along the second connection line 25.

A remaining refrigerant among the refrigerant discharged from the compressor 10 may flow into the chiller 20 along the opened first connection line 21.

The coolant may circulate in the coolant line 2 such that the coolant having exchanged heat with the refrigerant in the chiller 20 may be supplied to the battery module 4.

In other words, the refrigerant introduced into the chiller 20 may exchange heat with the coolant supplied from the battery module 4 through the coolant line 2, thereby increasing the temperature of the coolant.

The coolant heated in the chiller 20 may be supplied to the battery module 4 along the coolant line 2. Accordingly, the temperature of the battery module 4 may be efficiently increased by the coolant heated at the chiller 20.

As such, when the third connection line 29 is opened, the refrigerant having passed through the internal condenser 13 may rapidly flow without passing through the heat-exchanger 15. Accordingly, the hot gas heating of the vehicle interior may be more efficiently performed.

Simultaneously, the coolant heated at the chiller 20 may be supplied to the battery module 4 through the coolant line 2. Accordingly, the temperature of the battery module 4 may be rapidly increased.

In addition, the refrigerant having passed through the chiller 20 may be expanded while passing through the second expansion valve 23. The expanded refrigerant may flow into the accumulator 18 along the first connection line 21.

In other words, the refrigerant expanded in the first expansion valve 16 and the refrigerant expanded in the second expansion valve 23 may flow into the accumulator 18, respectively. The refrigerant introduced into the accumulator 18 may be separated into gas and liquid, and the gaseous refrigerant among the refrigerant separated into gas and liquid may flow into the compressor 10.

The refrigerant introduced into the compressor 10 may be supplied back to the internal condenser 13 and the chiller 20, respectively.

In other words, in the present embodiment, when the heat is not sufficient in the early stage of driving the vehicle in a state that the external temperature is low, while repeatedly performing the above-described operation, the vehicle interior may be heated by using the high-temperature refrigerant supplied from the compressor 10, and the temperature of the battery module 4 may be increased by using the coolant having exchanged heat in the chiller 20.

As described above, according to a heat pump system for a vehicle according to an embodiment, in a state that the external temperature is low and the heat generated from a heating element such as the electrical component is not sufficient in the early stage of driving the vehicle, the heating of the vehicle interior may be efficiently performed.

In addition, according to the present disclosure, since heating of the vehicle interior may be performed by using the high-temperature refrigerant compressed in the compressor 10 while minimizing the required number of components, an electric heater may not be employed, and streamlining and simplification of the entire system may be achieved.

In addition, according to the present disclosure, when the electric heater is employed, since the usage of the electric heater may be minimized, electricity consumption may be reduced, and an overall travel distance of the vehicle may be increased.

In addition, according to an embodiment, it is possible to reduce manufacturing cost and weight through simplification of an entire system, and to improve space utilization.

While the present disclosure has been described in connection with what is presently considered to be practical embodiments, it should be understood that the present disclosure is not limited to the disclosed embodiments. Additionally, the present disclosure is intended to cover various modifications and equivalent arrangements included within the spirit and scope of the appended claims.

DESCRIPTION OF SYMBOLS

2: coolant line.
4: battery module.
10: compressor.
11: refrigerant line
12: HVAC module
13: internal condenser
14: opening/closing door
15: heat-exchanger
15a: cooling fan
16: first expansion valve
17: evaporator
18: accumulator
20: chiller
21: first connection line
23: second expansion valve
25: second connection line
27: third expansion valve
29: third connection line

What is claimed is:

1. A heat pump system for a vehicle, comprising:
a compressor configured to compress a refrigerant circulating the heat pump system;
a heat, ventilation, and air condition (HVAC) module including an internal condenser, an evaporator connected to the compressor via a refrigerant line, and an opening/closing door configured to adjust air having passed through the evaporator to be selectively introduced into the internal condenser based on a cooling mode or a heating mode of the vehicle;
a heat-exchanger connected to the internal condenser via the refrigerant line and configured to selectively condense or evaporate refrigerant introduced thereto by exchanging heat with ambient air based on an operation of a third expansion valve;
a first expansion valve provided in the refrigerant line between the heat-exchanger and the evaporator;
an accumulator provided in the refrigerant line between the evaporator and the compressor;
a first connection line including: a first end connected to the refrigerant line between the compressor and the internal condenser, and a second end connected to the accumulator;
a chiller provided in the first connection line, and configured to adjust a temperature of a coolant by exchanging heat between the refrigerant introduced into the first connection line and a selectively introduced coolant;
a second expansion valve provided in the first connection line between the chiller and the accumulator; and a second connection line including: a first end connected to the first expansion valve, and a second end connected to the accumulator.

2. The heat pump system of claim 1,
wherein the third expansion valve is provided in the refrigerant line between the internal condenser and the heat-exchanger; and
a third connection line including: a first end connected to the third expansion valve, and a second end connected to the refrigerant line between the heat-exchanger and the first expansion valve.

3. The heat pump system of claim 2, wherein the first expansion valve, the second expansion valve, and the third expansion valve are electronic expansion valves configured to selectively expand the refrigerant while controlling a flow of the refrigerant.

4. The heat pump system of claim 2, wherein, in a hot gas heating mode of a vehicle interior:
the refrigerant line connecting the first expansion valve and the evaporator and the refrigerant line connecting the evaporator and the accumulator are closed by an operation of the first expansion valve;
the first connection line is opened by an operation of the second expansion valve; and
the second connection line is opened by the operation of the first expansion valve.

5. The heat pump system of claim 4, wherein the third connection line is selectively opened and closed by an operation of the third expansion valve.

6. The heat pump system of claim 5, wherein, when the third connection line is opened:
the refrigerant line connecting the heat-exchanger and the third expansion valve is closed; and
the refrigerant line connecting the heat-exchanger and a second end of the third connection line is closed.

7. The heat pump system of claim 5, wherein, when the third connection line is closed:
the refrigerant line connecting the internal condenser and the heat-exchanger is opened by the operation of the third expansion valve; and
the refrigerant line connecting the heat-exchanger and the first expansion valve is opened.

8. The heat pump system of claim 4, wherein the first expansion valve is configured to expand the refrigerant supplied via the refrigerant line.

9. The heat pump system of claim 4, wherein the second expansion valve is configured to expand the refrigerant having passed through the chiller and flow the expanded refrigerant to the first connection line.

10. The heat pump system of claim 4, wherein the third expansion valve is configured to flow the refrigerant having passed through the internal condenser without expansion.

11. The heat pump system of claim 4, wherein:
a partial refrigerant, among the refrigerant discharged from the compressor, flows into the internal condenser along the refrigerant line; and
a remaining refrigerant, among the refrigerant discharged from the compressor, flows into the chiller along the first connection line.

12. The heat pump system of claim 4, wherein the chiller is connected to a battery module via a coolant line through which the coolant circulates.

13. The heat pump system of claim 12, wherein, when heating the battery module in the hot gas heating mode of the vehicle interior, the coolant circulates via the coolant line such that the coolant having exchanged heat with the refrigerant in the chiller is supplied to the battery module.

14. The heat pump system of claim 2, wherein, in a hot gas heating and dehumidifying mode of a vehicle interior:

the refrigerant line connecting the first expansion valve and the evaporator is opened by an operation of the first expansion valve;

the refrigerant line connecting the evaporator and the accumulator is opened;

the first connection line is opened by an operation of the second expansion valve; and the second connection line is closed by the operation of the first expansion valve.

15. The heat pump system of claim 14, wherein, when the third connection line is opened by the third expansion valve:

the refrigerant line connecting the heat-exchanger and the third expansion valve is closed; and the refrigerant line connecting the heat-exchanger and a second end of the third connection line is closed.

16. The heat pump system of claim 14, wherein, when the third connection line is closed by the third expansion valve:

the refrigerant line connecting the internal condenser and the heat-exchanger is opened by the operation of the third expansion valve; and the refrigerant line connecting the heat-exchanger and the first expansion valve is opened.

17. The heat pump system of claim 14, wherein:

the first expansion valve is configured to expand the refrigerant supplied via the refrigerant line and flow the expanded refrigerant to the evaporator; and the second expansion valve is configured to expand the refrigerant having passed through the chiller and flow the expanded refrigerant to the first connection line.

18. The heat pump system of claim 14, wherein the third expansion valve is configured to flow the refrigerant having passed through the internal condenser to the refrigerant line without expansion.

19. The heat pump system of claim 1, wherein the second expansion valve is disposed at a rear end of the chiller based on a flow direction of the refrigerant flowing along the first connection line such that the refrigerant having passed through the chiller is introduced.

* * * * *